June 30, 1936. P. LIM 2,046,175
VEHICLE
Original Filed June 17, 1932 3 Sheets-Sheet 1
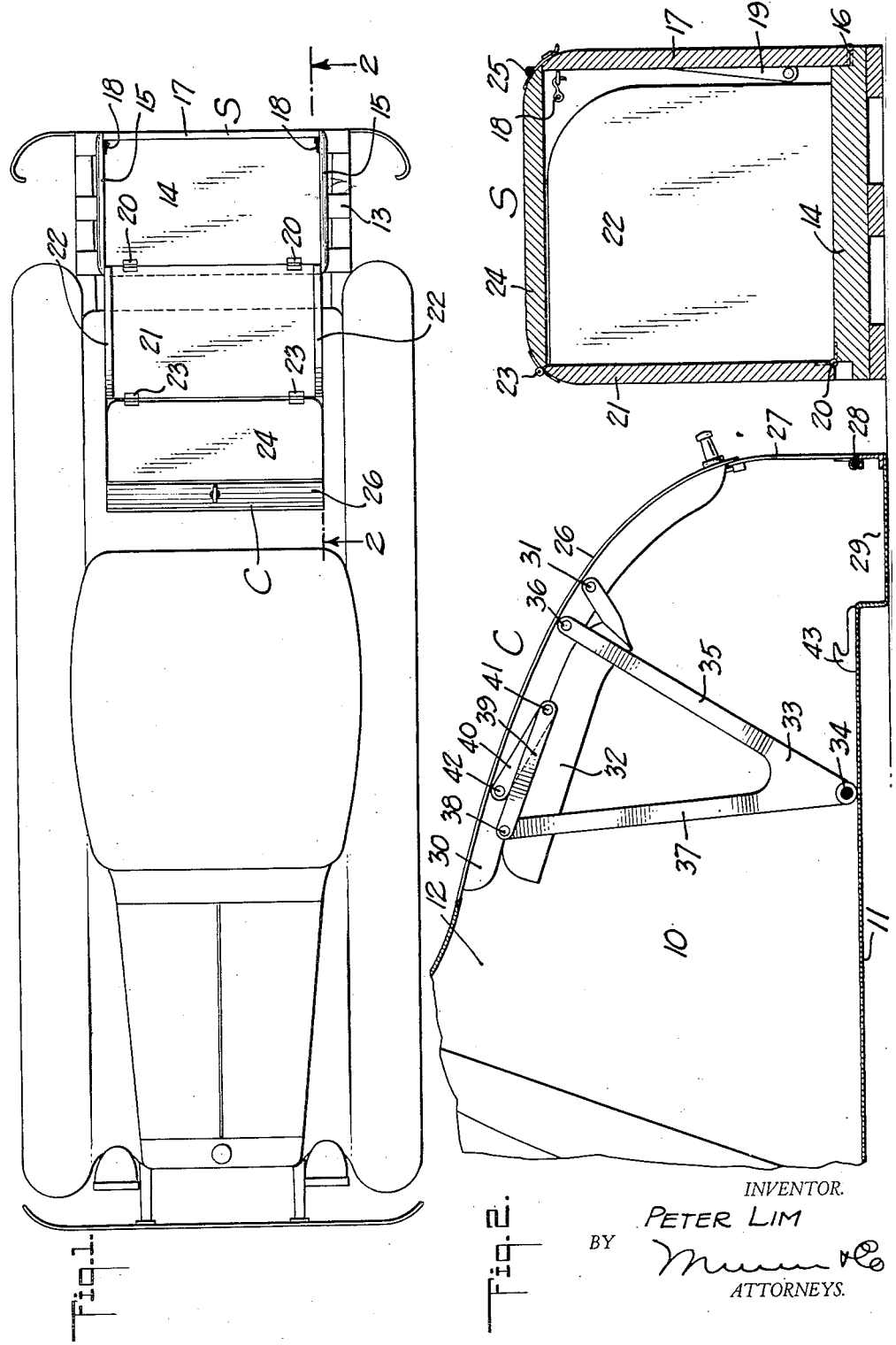
INVENTOR.
PETER LIM
BY
ATTORNEYS.

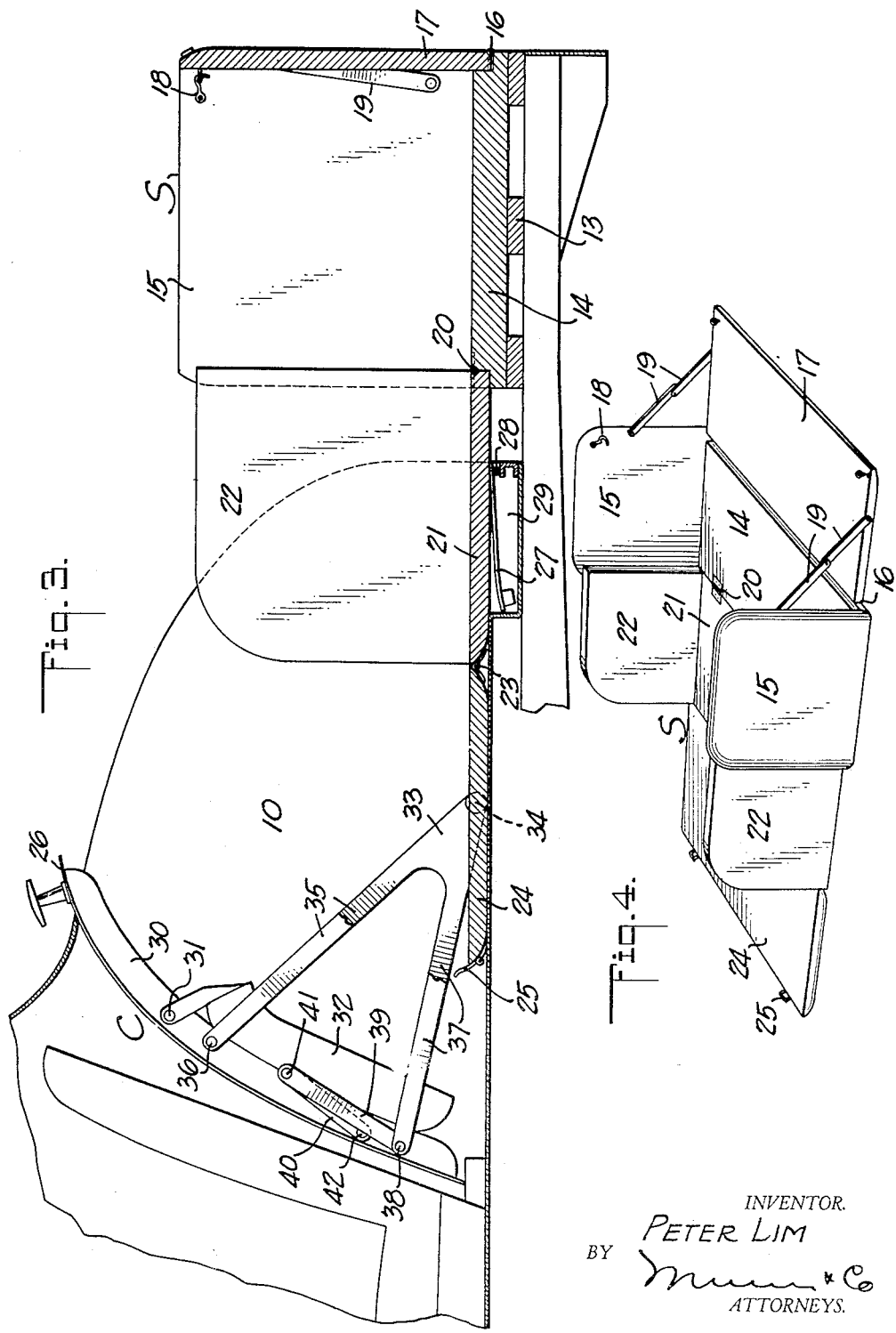

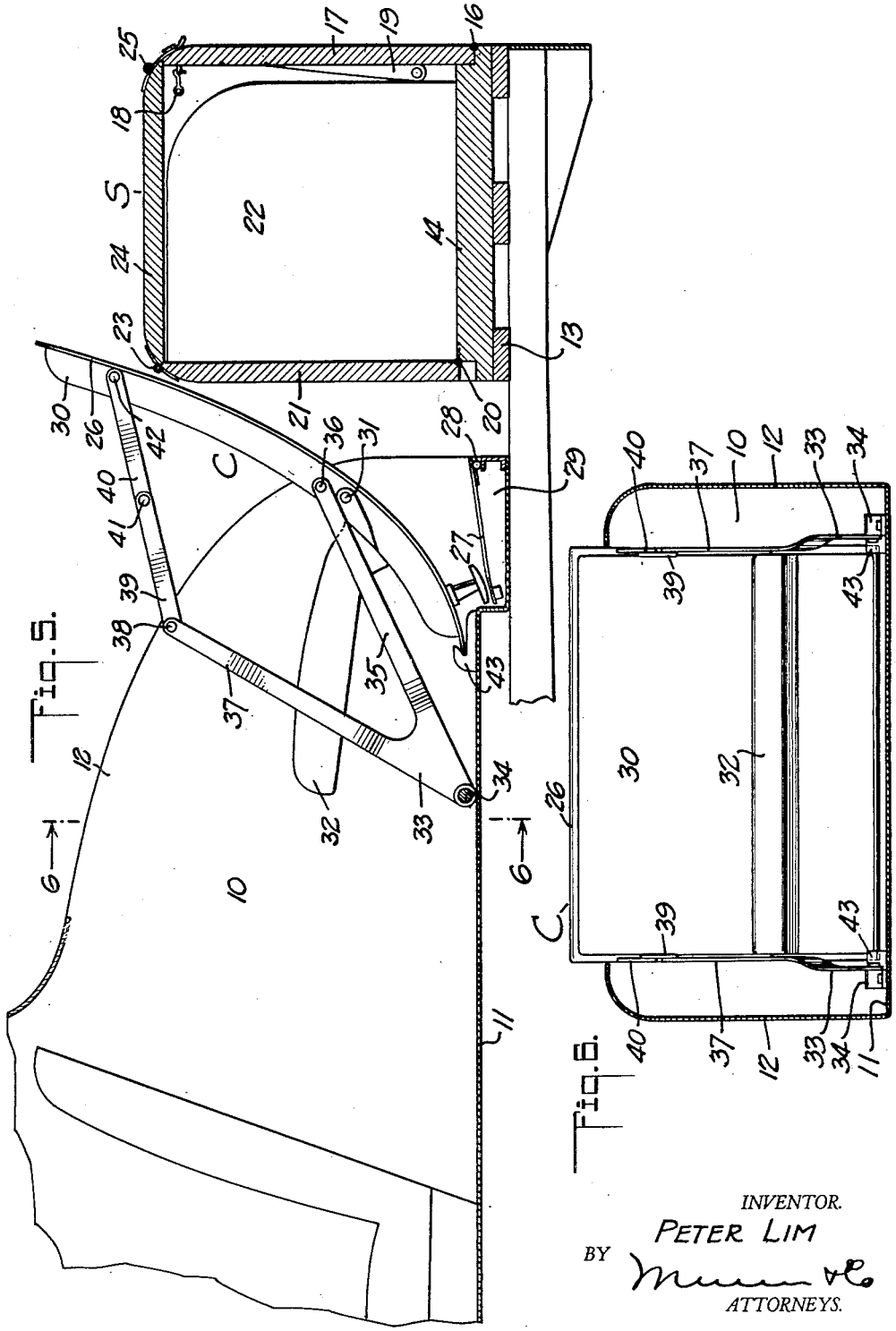

Patented June 30, 1936

2,046,175

UNITED STATES PATENT OFFICE 2,046,175

VEHICLE

Peter Lim, Los Angeles, Calif.

Application June 17, 1932, Serial No. 617,890
Renewed May 16, 1935

11 Claims. (Cl. 296—66)

This invention relates generally to vehicles of the character embodied in my co-pending application Serial No. 593,626, filed February 17, 1932, now Patent No. 1,953,084, issued April 3, 1934, wherein a convertible structure forming a trunk of conventional appearance at the rear of a pleasure automobile of the roadster or coupe type can be utilized to co-operate with the body of the vehicle in providing a storage space of large capacity, so that the vehicle can be employed for delivery and other purposes.

It is a purpose of the present invention to provide a convertible structure of the above described character which, in its association with a vehicle, performs all the functions of the former invention, with the added advantages of simplified construction, less manufacturing cost and greater ease of manipulation to convert the structure for use as a separate trunk or in conjunction with the body of the vehicle to form the storage space of large capacity.

It is a further purpose of this invention to provide in an automobile of the type having a deck space in the rear of the body thereof a closure for the deck space embodying a seat and means by which the closure is mounted to either enclose the deck space or provide convenient access to the deck space while enabling the latter to be completely utilized for storage purposes either independently of or in conjunction with the convertible structure; or to form a comfortable seat, all with the utmost ease and dispatch.

In the accompanying drawings:

Figure 1 is a view showing in plan a pleasure automobile of the roadster or coupe type with one form of convertible structure embodying this invention, associated therewith and being utilized to form a storage space of large capacity in conjunction with the deck space of the vehicle body;

Figure 2 is an enlarged longitudinal sectional view taken on the line 2—2 of Figure 1, but illustrating the convertible structure being utilized as a trunk with the deck space closed;

Figure 3 is a view similar to Figure 2, but with the parts of this invention occupying the positions shown in Figure 1;

Figure 4 is a perspective view of the convertible structure in fully opened position and separated from the vehicle;

Figure 5 is a view similar to Figure 2 with the convertible structure utilized as a trunk and the closure forming a rumble seat;

Figure 6 is a transverse sectional view taken on the line 6—6 of Figure 5.

Referring specifically to the drawings, wherein similar reference characters designate similar parts in each of the several views, this invention is shown associated with a vehicle the body of which is of the roadster or coupe type embodying at the rear thereof a deck space 10 defined by a bottom wall 11 and side walls 12—12 rising therefrom and curving downwardly and rearwardly as the vehicle is viewed in side elevation. From the rear of the body projects a conventional form of trunk rack 13 which is utilized as a support for the convertible structure embodying this invention and designated generally at S. The opening of the deck space is controlled by a closure designated generally at C, which is mounted and manipulated to occupy the several positions shown in Figures 2, 3 and 5 in a manner to be hereinafter described.

The convertible structure S is composed of sections in the form of rectangular panels, a bottom section 14 being rigidly secured to the trunk rack 13 and having end sections 15—15 rising therefrom and rigidly secured thereto. The bottom and end sections form the stationary portion of the convertible structure; and hingedly connected at 16 to the rear longitudinal edge of the bottom section 14 is a side section 17 which can be latched in the vertical position shown in Figures 1, 2, 3 and 5 by suitable catches 18, or can be supported in the horizontal position shown in Figure 4 by links 19 arranged in pivotally connected pairs pivoted to the end sections 15 and to the side section 17 as clearly shown in this figure. The side section can thus be utilized to form the rear wall of the structure when converted to provide a trunk, or to form a rearward extension of the bottom section 14 in the manner of a tail gate.

Hingedly connected at 20 to the forward longitudinal edge of the bottom section 14 is a side section 21 having end panels 22 rigidly secured thereto. In the position of the convertible structure shown in Figures 2 and 5, the side section 21 forms the front wall of the trunk with the panels 22 disposed at the inner sides of the end sections 15, whereas in the position shown in Figures 1, 3 and 4, the side section 21 rests horizontally upon the bottom wall 11 of the body in the plane of the bottom section 14, so as to span the space between the rear end of the body and the bottom section, while the panels 22 span the space between the side walls 12—12 of the body and the end sections 15—15.

Hingedly connected at 23 to the free longitudinal edge of the side section 21 is a top section 24 which, in the position of this side section shown in Figures 2 and 5, forms the top wall of the trunk and can be latched to the side section 17 by suitable latches 25. In the position shown in Figures 1, 3 and 4, the top section 24 is swung about the hinge 23 to also rest upon the bottom wall 11 of the body in advance of the side section 21 and in the plane of the bottom section 14.

It will be clear that by the provision of the convertible structure above described, that the sections thereof can be folded to form a conventional trunk independent of the deck space when the vehicle is to be used for pleasure, whereas upon unfolding the sections the structure will co-operate with the deck space to form a continuation of the latter rearwardly of the vehicle body so as to greatly enlarge the capacity of the storage space and enable the vehicle to be used for delivery and other purposes.

The previously mentioned closure C comprises a main cover 26 and an auxiliary cover 27, the latter only being necessary with certain types of vehicles and being hingedly mounted at the rear edge of the body as indicated at 28 to occupy a raised position or the lowered position shown in Figure 3 wherein it rests in a recess 29 of the bottom wall 11 so as to be disposed below the plane of the bottom wall to permit the side section 21 of the convertible structure to rest upon the bottom wall as previously described. In the raised position of the auxiliary cover 27 shown in Figure 2, it is adapted to co-act with the main cover 26 in completely enclosing the deck space.

The inner side of the main cover 26 is constructed to provide a seat back 30 and has pivoted thereto at 31 a seat 32 adapted to be disposed parallel to the seat back or at an angle to the latter for co-action therewith. The main cover 26 is mounted on the body for movement to occupy one position wherein it co-acts with the auxiliary cover 27 in closing the deck space as shown in Figure 2; a second position wherein it is disposed substantially vertically in the forward end of the deck space as shown in Figure 3; and a third position at the rear portion of the deck space wherein its seat back 30 and the seat 32 co-act to provide a rumble seat, see Figure 5.

To this end and in the present instance, V-shaped arms 33—33 are pivoted in the deck space at 34—34; and one branch 35 of each arm is pivoted at 36 to the main cover 26. The other branch 37 of each arm is pivotally connected at 38 to one of a pair of links 39 and 40 pivotally connected at 41, with the link 40 pivotally connected at 42 to the main cover 26.

When the main cover occupies the closed position shown in Figure 2, the links 39 and 40 occupy the folded positions shown in this figure, and remain folded as the main cover is swung bodily about the axes 34—34 to the open position in the forward portion of the deck space, as shown in Figure 3. In the position of the main and auxiliary covers shown in this figure, the sections of the convertible structure can be unfolded for co-operation with the deck space as previously described in detail.

However, when it is desired to utilize the rumble seat, the main cover 26 is first swung bodily from the position shown in Figure 3 about the axes 34—34 until the forward edge of the deck space opening is cleared, following which the main cover is swung about the pivotal connections 36—36 of the branches 35—35 with the main cover, until the pairs of links 39, 40, are extended as shown in Figure 5, and in which position the main cover engages stops 43—43 secured to the bottom wall 11 of the deck space.

The stops 43 co-act with the arms 33 and the links 39, 40, to support the cover with its seat back 30 disposed for co-action with the seat 32, and it is to be noted that the links can be constructed to provide arm rests for occupants of the seat. It is to be understood that the auxiliary cover 27 occupies its lowered position in the recess 29 and that the convertible structure S is folded to form the trunk, all so as not to interfere with movement of the main cover to seat forming position. It is to be noted that the seat 32 can be maintained in the position shown in Figure 2 either by friction at its pivots 31 or by any suitable fastening means such as a conventional spring latch (not shown).

What is claimed is:

1. In a vehicle, a vehicle body having a deck storage space; a cover for the storage space; means for mounting the cover on the body for movement to occupy one position closing the storage space and a second position wherein the cover is disposed vertically in the forward portion of the storage space; means for mounting the cover for unitary movement to occupy a third position wherein the cover is disposed vertically at the rear portion of the storage space; and means carried by the cover, providing a seat when the cover occupies its third mentioned position.

2. In a vehicle, a vehicle body having a deck storage space; a cover for the storage space; means for mounting the cover on the body for movement to occupy one position closing the storage space and a second position wherein the cover is disposed vertically in the forward portion of the storage space; means for mounting the cover on the first means for movement to occupy a third position wherein the cover is disposed vertically at the rear portion of the storage space; and means carried by the cover, providing a seat when the cover occupies its third mentioned position.

3. In a vehicle, a vehicle body having a deck storage space; a cover for the storage space; means for mounting the cover on the body for pivotal movement to occupy one position closing the storage space and a second position wherein the cover is disposed vertically in the forward portion of the storage space; means for mounting the cover on the first means for pivotal movement to occupy a third position wherein the cover is disposed vertically at the rear portion of the storage space; and means carried by the cover, providing a seat when the cover occupies its third mentioned position.

4. In a vehicle, a vehicle body having a deck space; a cover for the deck space; means for mounting the cover on the body for movement about one axis; means for mounting the cover on the first means for movement about a second axis; said axes being so located relative to each other as to enable the cover to occupy a closed position, an open position wherein the cover is disposed in the forward portion of the deck space, and a second open position wherein the cover is disposed at the rear portion of the deck space; and means on the cover providing a seat when the cover occupies its second open position.

5. In a vehicle, a vehicle body having a deck space; a cover for the deck space; means for mounting the cover on the body for movement about one axis; means for mounting the cover on the first means for movement about a second axis; said axes being so located relative to each other as to enable the cover to occupy a closed position, an open position wherein the cover is disposed in the forward portion of the deck space, and a second open position wherein the cover is disposed at the rear portion of the deck space; means on the body and the first means co-acting with the cover to support the latter in its second open position; and means on the cover providing a seat when the cover occupies its second open position.

6. In a vehicle, a vehicle body having a deck space; a cover for the deck space; means for mounting the cover on the body for movement to occupy a closed position, an open position with respect to the deck space wherein the cover is disposed in the forward portion of the deck space, or a second open position wherein the cover is disposed at the rear portion of the deck space; means on said first means for supporting the cover in its second open position; and means on the cover providing a seat when the cover occupies its second open position.

7. In a vehicle, a vehicle body having a deck space; a closure for the deck space; a pair of arms pivoted on the body and pivotally connected to the cover; a pair of pivotally connected links for each arm; means for pivotally connecting one link of each pair to the respective arm and the other link of the pair to the cover for co-action with the arms in mounting the cover for movement to occupy a closed position, an open position wherein the cover is disposed in the forward portion of the deck space, and a second open position wherein the cover is disposed at the rear portion of the deck space; means co-acting with the links to support the cover in its second open position; and means carried by the cover providing a seat when the cover occupies its second open position.

8. In a vehicle, a vehicle body having a deck space; a closure for the deck space; a pair of arms pivoted on the body and pivotally connected to the cover; a pair of pivotally connected links for each arm; means for pivotally connecting one link of each pair to the respective arm and the other link of the pair to the cover for co-action with the arms in mounting the cover for movement to occupy closed and open positions wherein the links of each pair are folded, and a second open position wherein the links of each pair are extended; stops on the body engaged by the cover and co-acting with the links to support the cover in its second open position; and means on the cover providing a seat when the cover occupies its second open position.

9. In a vehicle, a vehicle body having a deck space; a cover for the deck space; means for mounting the cover on the body for movement to occupy a closed position with respect to the deck space and an open position wherein the cover is disposed in the forward portion of the deck space; and means co-operable with the first means and with the cover for disposing the cover in a second open position wherein the cover is situated at the rear portion of the deck space; and means carried by the cover, providing a seat when the cover occupies its second open position.

10. In a vehicle, a vehicle body having a deck storage space, a cover for the storage space, means for mounting the cover on the body for movement to occupy one position closing the storage space and a second position wherein the cover is disposed upright at the forward portion of the storage space, means for mounting the cover for unitary movement to occupy a third position wherein the cover is disposed upright at the rear portion of said storage space, and means on the cover providing a seat when the cover occupies its third position.

11. In a vehicle, a vehicle body having a deck storage space, a cover for the storage space, means for mounting the cover on the body for movement to occupy one position closing the storage space and a second position wherein the cover is disposed upright within the storage space at the forward portion thereof, means cooperable with the first named means and with the cover for disposing said cover in an upright position located at the rear portion of the deck storage space, and means pivotally connected to said cover and movable therewith providing a seat when the cover occupies its last named upright position.

PETER LIM.